United States Patent
Boutaghou et al.

[11] Patent Number: 6,122,130
[45] Date of Patent: Sep. 19, 2000

[54] INTELLIGENT LUBRICANT FOR RAMP LOAD/UNLOAD

[75] Inventors: Zine Eddine Boutaghou, Vadnais Heights; Jorge Vicente Hanchi, Bloomington, both of Minn.

[73] Assignee: Seagate Technology, Inc., Scotts Valley, Calif.

[21] Appl. No.: 09/078,858

[22] Filed: May 14, 1998

Related U.S. Application Data

[60] Provisional application No. 60/063,617, Oct. 27, 1997.

[51] Int. Cl.$^7$ .................................................... G11B 21/02
[52] U.S. Cl. ............................................. 360/75; 360/105
[58] Field of Search ....................................... 360/75, 105

[56] References Cited

U.S. PATENT DOCUMENTS

| | | | |
|---|---|---|---|
| 4,864,437 | 9/1989 | Couse et al. | 360/75 |
| 4,933,785 | 6/1990 | Morehouse et al. | 360/78.04 |
| 5,034,837 | 7/1991 | Schmitz | 360/105 |
| 5,235,482 | 8/1993 | Schmitz | 360/97.02 |
| 5,455,723 | 10/1995 | Boutaghou et al. | 360/75 |
| 5,926,346 | 7/1999 | Briggs | 360/105 |

*Primary Examiner*—Paul Loomis
*Assistant Examiner*—Dan I. Davidson
*Attorney, Agent, or Firm*—Schwegman, Lundberg, Woessner & Kluth, P.A.

[57] ABSTRACT

A disk drive system includes a base, a disk rotatably attached to the base, and an actuator assembly movably attached to the base. The actuator assembly moves the transducer to selected areas of the disk where information representative of data is to be written or read. The actuator assembly maintains the transducer in a transducing relationship with the disk. The actuator assembly also parks the transducer or unloads the transducer to a park position. A portion of the actuator assembly rides over a ramp to a park position. The ramp includes a mechanism for varying the coefficient of friction on the surface of the ramp. The ramp has a lower coefficient of friction when the actuator is unloading the transducer from the disk. When the actuator is placed in a park position, the coefficient of friction on the surface of the ramp is increased to help retain the actuator in its parked position. This helps maintain the actuator assembly in a parked position in the event of shock loading from dropping a computer or a disk drive. This in turn helps prevent head crashes or failure of the disk drive and possible data loss.

18 Claims, 4 Drawing Sheets

INTELLIGENT LUBRICANT FOR RAMP LOAD/UNLOAD

RELATED APPLICATION

This application claims the benefit of U.S. Provisional Application Ser. No. 60/063,617, filed Oct. 27, 1997 under 35 USC119(e).

FIELD OF THE INVENTION

The present invention relates to the field of mass storage devices. More particularly, this invention relates to a disk drive which includes a ramp for loading and unloading the transducing head.

BACKGROUND OF THE INVENTION

One of the key components of any computer system is a place to store data. Computer systems have many different places where data can be stored. One common place for storing massive amounts of data in a computer system is on a disk drive. The most basic parts of a disk drive are a disk that is rotated, an actuator that moves a transducer to various locations over the disk, and electrical circuitry that is used to write and read data to and from the disk. The disk drive also includes circuitry for encoding data so that it can be successfully retrieved and written to the disk surface. A microprocessor controls most of the operations of the disk drive as well as passing the data back to the requesting computer and taking data from a requesting computer for storing to the disk.

The transducer is typically housed within a small ceramic block. The small ceramic block is passed over the disk in a transducing relationship with the disk. The transducer can be used to read information representing data from the disk or write information representing data to the disk. When the disk is operating, the disk is usually spinning at relatively high RPM. These days common rotational speeds are 5100 and 7200 RPM. Rotational speeds of 10,000 RPM and higher are contemplated for the future. These high rotational speeds place the small ceramic block in high air speeds. The small ceramic block, also referred to as a slider, is usually aerodynamically designed so that it flies over the disk. The best performance of the disk drive results when the ceramic block is flown as closely to the surface of the disk as possible. Today's small ceramic block or slider is designed to fly on a very thin layer of gas or air. In operation, the distance between the small ceramic block and the disk is very small. Currently "fly" heights are about 12 microinches. In some disk drives, the ceramic block does not fly on a cushion of air but rather passes through a layer of lubricant on the disk.

Information representative of data is stored on the surface of the memory disk. Disk drive systems read and write information stored on tracks on memory disks. Transducers, in the form of read/write heads, located on both sides of the memory disk, read and write information on the memory disks when the transducers are accurately positioned over one of the designated tracks on the surface of the memory disk. The transducer is also said to be moved to a target track. As the memory disk spins and the read/write head is accurately positioned above a target track, the read/write head can store data onto a track by writing information representative of data onto the memory disk. Similarly, reading data on a memory disk is accomplished by positioning the read/write head above a target track and reading the stored material on the memory disk. To write on or read from different tracks, the read/write head is moved radially across the tracks to a selected target track. The data is divided or grouped together on the tracks. In some disk drives, the tracks are a multiplicity of concentric circular tracks. In other disk drives, a continuous spiral is one track on one side of a disk drive. Servo feedback information is used to accurately locate the transducer. The actuator assembly is moved to the required position and held very accurately during a read or write operation using the servo information.

One of the most critical times during the operation of a disk drive is just before the disk drive shuts down. The small ceramic block is typically flying over the disk at a very low height when shutdown occurs. In the past, the small block was moved to a non data area of the disk where it literally landed and skidded to a stop. Problems arise in such a system. When disks were formed with a smooth surface, stiction would result between the small ceramic block and the head. In some instances the force due to stiction was so strong that it virtually ripped the head off the suspension. Amongst the other problems was a limited life of the disk drive. Each time the drive was turned off another start stop contact cycle would result. After many start stop contacts, the small ceramic block may chip or produce particles. The particles could eventually cause the disk drive to fail. When shutting down a disk drive, several steps are taken to help insure that the data on the disk is preserved. In general, the actuator assembly is moved so that the transducers do not land on the portion of the disk that contains data. There are many ways to accomplish this. A ramp on the edge of the disk is one design method that has gained industry favor more recently. Disk drives with ramps are well known in the art. U.S. Pat. No. 4,933,785 issued to Morehouse et al. is one such design. Other disk drive designs having ramps therein are shown in U.S. Pat. Nos. 5,455,723, 5,235,482 and 5,034,837.

Typically, the ramp is positioned to the side of the disk. A portion of the ramp is positioned over the disk itself. In operation, before power is actually shut off, the actuator assembly swings the suspension or another portion of the actuator assembly up the ramp to a park position at the top of the ramp. When the actuator assembly is moved to a position where parts of the suspension are positioned on the top of the ramp, the sliders or ceramic blocks do not contact the disk. Commonly, this procedure is known as unloading the heads. Unloading the heads helps to insure that data on the disk is preserved since, at times, unwanted contact between the slider and the disk results in data loss on the disk.

When the disk is not being used this may be a critical time. If the disk drive is shock loaded, it is most desirable to have the actuator arm stay in its parked position with the suspensions atop the ramp. Sometimes, when a disk drive is shock loaded, the actuator arm leaves the ramp and the small ceramic block or slider contacts or slaps the disk. This may cause an immediate loss of data or may result in generation of particles. Particle generation may result in a later loss of data.

Startup of a disk drive with a ramp is another critical time. Startup includes moving the actuator assembly so that the suspension slides down the ramp and so that the slider flies when it gets to the bottom of the ramp. It is desirable to have the ramp well lubricated so that the suspension assembly goes down the ramp easily. It is also desirable to control the speed at which the suspension goes down the ramp so as to prevent contact between the slider and the disk. If the velocity can be controlled as the suspension moves down the ramp, the slider will not contact the disk.

U.S. Pat. No. 4,864,437 issued to Couse et al. teaches one way of controlling the velocity of the slider as it moves down a ramp. In Couse et al., the voltage across a voice coil motor is monitored and controlled. The voltage across the voice coil motor includes a small component of the total voltage known as Back EMF. A voice coil motor includes magnets and an actuator coil. When the actuator coil cuts a magnetic field, Back EMF is generated. The Back EMF varies as a function of the velocity of the actuator coil through the magnetic field produced by the magnets of the voice coil motor and, presumably, as a function of the velocity of the actuator down the ramp. Thus, it is possible to get an estimate of the rotational velocity of the actuator from the Back EMF of the actuator motor. The design of the velocity control in Couse et al. also has problems. Most problematic is that the Back EMF is a very small component of the total voltage across the coil of the actuator. This component will also become smaller as additional current is passed through the coil. The Back EMF signal is also prone to noise. In short, since the Back EMF component of the voltage across the actuator is small and prone to noise, it does not always reliably reflect the actual velocity of the slider. In addition, as the operating temperature of the disk drive increases, the noise level increases making the Back EMF an even smaller component and even more prone to noise. If there happens to be an error indicating that the velocity is slower than it actually is, then an increase in the actuator coil current may cause the velocity of the slider down the ramp to increase to the point where the slider will contact the surface of the disk.

There is a need for a method and apparatus that can maintain the actuator arm assembly in a parked position even when power is removed from the disk drive. There is also a need to allow the suspension to slide up and down the ramp easily. There is a further need for a method and apparatus that may be used to effectively control the velocity of the actuator as it goes up and down the ramp.

SUMMARY OF THE INVENTION

A disk drive system includes a base, a disk rotatably attached to the base, and an actuator assembly movably attached to the base. A ramp for loading and unloading the transducing element to and from the disk is also attached to the base. The ramp is made from a first material and has an electrical circuit embedded within the ramp. The electrical circuit is positioned within the ramp so that the field it generates extends to the surface of the ramp. The ramp also includes a liquid crystal dispersed within the first material of the ramp. When the electric field is not present, the liquid crystals are in no particular order. In this state the ramp surface has a first coefficient of friction associated with the ramp. In the presence of the electric field, the liquid crystals align. This produces a coefficient of friction which is lower than when the electric field is not present at the ramp surface. The ramp, therefore, has two different coefficients of friction. The coefficient of friction is lower when the actuator assembly slides up and down the ramp to load and unload the transducer. The coefficient of friction is higher when the actuator is positioned within the parking detent. Advantageously, the actuator assembly will be more likely to stay on the ramp when no electrical field is present, such as when the power to the disk drive is removed. The ramp will resist movement of the actuator assembly and resist an unintended movement of the transducer or actuator assembly over the surface of the disk. Such unintended movements may result in a head crash, or the transducer coming off the actuator assembly due to stiction between the transducer head and the disk. In the power off condition, the actuator assembly will be more likely to stay parked within the parking detent since the coefficient of friction is higher than when the actuator assembly slides up the ramp and into the parking detent.

DESCRIPTION OF THE PREFERRED EMBODIMENT

In the following detailed description of the preferred embodiments, reference is made to the accompanying drawings which form a part hereof, and in which are shown by way of illustration specific embodiments in which the invention may be practiced. It is to be understood that other embodiments may be utilized and structural changes may be made without departing from the scope of the present invention.

Figure 1:
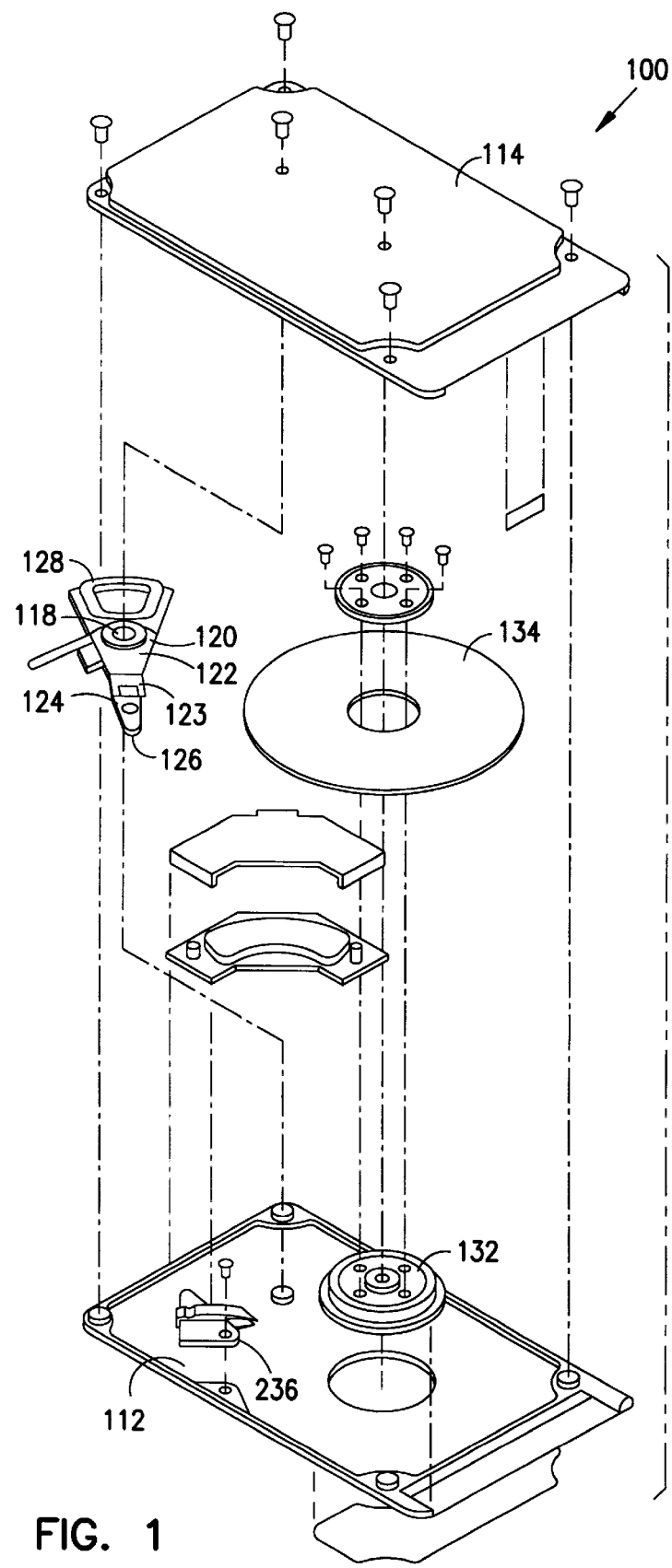
FIG. 1 is an exploded view of a disk drive.

The invention described in this application is useful with all mechanical configurations of disk drives having either rotary or linear actuation. FIG. 1 is an exploded view of a disk drive 100 having a rotary actuator. The disk drive 100 includes a housing 112, and a housing cover 114. The housing 112 and housing cover 114 form a disk enclosure. Rotatably attached to the housing 112 on an actuator shaft 118 is an actuator assembly 120. The actuator assembly 120 includes a comb-like structure 122 having a plurality of arms 123. Attached to the separate arms 123 on the comb 122, are load beams or load springs 124. Attached at the end of each load spring 124 is a slider 126 which carries a magnetic transducer 150. The slider 126 with the transducer 150 form what is many times called the head. It should be noted that many sliders have one transducer 150 and that is what is shown in the Figures. It should also be noted that this invention is equally applicable to sliders having more than one transducer, such as what is referred to as an MR or magnetoresistive head in which one transducer 150 is generally used for reading and another is generally used for writing. On the end of the actuator arm assembly 120 opposite the load springs 124 and the sliders 126 is a voice coil 128.

Attached within the housing 112 is a pair of magnets 130. The pair of magnets 130 and the voice coil 128 are key parts of a voice coil motor which applies a force to the actuator assembly 120 to rotate it about the actuator shaft 118. Also mounted to the housing 112 is a spindle motor 132. The spindle motor 132 includes a rotating portion called the spindle hub 133. In FIG. 1, a single disk 34 is attached to the spindle hub 133. In other disk drives a number of disks may be attached to the hub. The invention described herein is equally applicable to disk drives have a number of disks attached to the hub of the spindle motor.

Figure 2:
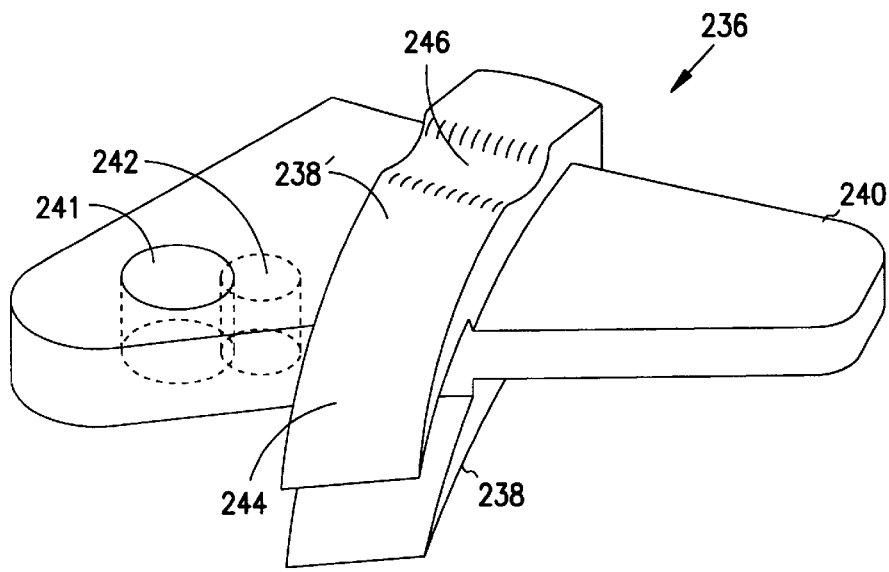
FIG. 2 is a isometric view of a ramp from a disk drive.

Also attached to the housing 112 is a ramp structure 236. Now looking at both FIGS. 1 and 2, the ramp structure has two ramp portions 238 and 238'. One of the ramp portions 238 is for the loading and unloading the transducer from the bottom surface of the disk and the other ramp portion 238' is for loading and unloading a transducer from the top surface of the disk. The ramp structure 136 shown in FIG. 2 is fixed and a portion of each of the ramp portions 238 and 238' of the ramp is positioned over the disk 134. It should be noted that this invention could also be used on ramps that rotate in and out of a load/unload position.

FIG. 2 is an isometric view detailing the ramp structure 236. The ramp structure 236 includes the ramp portions 238 and 238' and the ramp support structure 240. The support structure 240 has a first opening 241 and a second opening 242 therein which facilitate mounting the ramp 236 to a pair of corresponding pegs on the housing 112. The ramp structure 236 includes an inclined surface 244 and a parking detent 246.

Figure 3:
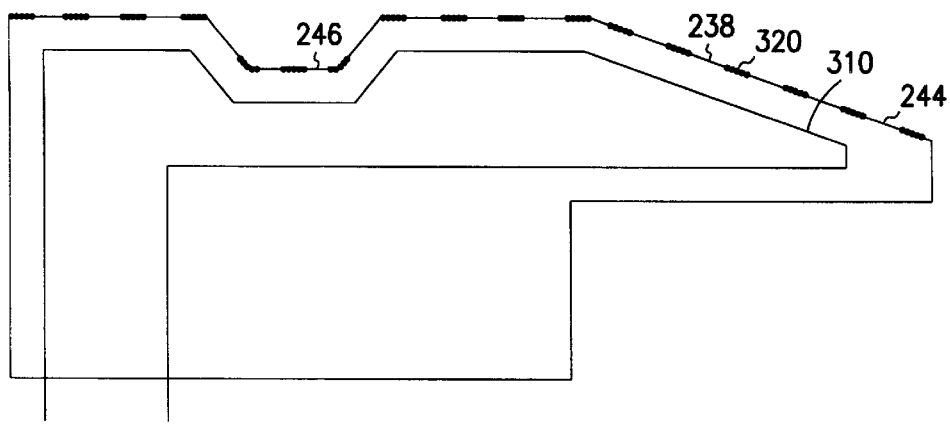
FIG. 3 is a cross sectional side view of the ramp having an electrical circuit embedded therein.

FIG. 3 is a cross sectional side view of the ramp structure 236 showing one ramp 238. The ramp structure further includes an electrical circuit 310 embedded therein. The inclined surface 244 and the surface of the parking detent 246 include a liquid crystal polymer 320. The sliding surface of the ramp is coated with a Liquid-Crystalline-Polymer-based lubricant layer/film. The LCP (Liquid-Crystalline-Polymer) chains in the lubricant layer/film attach to the ramp surface by means of a suitable polar end group. The polar group is chosen so that affinity between the LCP molecules and the ramp surface is optimized. In other words, the interfacial adhesive strength of ramp-surface/lubricant-layer interface is maximized. The nature of the polar end group will depend on the nature of polymer of which the ramp is made as well as that of the LCP used as lubricant.

The LCP selected for this application should be a low glass transition temperature ($T_g$), glassy nematic LCP. In other words, the LCP should be amorphous or non-crystalline, since crystallinity would limit orientation by external force fields to temperatures above the melting temperature, which is greater than $T_g$. The $T_g$ of the LCP in question should be such that orientation by an external force field (electrical field in our case) can be achieved at room temperature. It should be noted that the nematic LCP will become "orientable" by an external force field at a temperature above the $T_g$, at which the transition to the nematic liquid crystalline state occurs.

An LCP suitable for our application would be similar to one developed relatively recently by the Goodyear Co. which is a random thermotropic terpolyester, which is based on p-hydroxybezoic acid, chlorohydroquinone and azealic acid. The reported range for $T_g$ for the LCP in question is from 3° C. to 25° C., with the magnitude of the $T_g$ depending on the molecular weight of the LCP. Of course, at lower molecular weight, the value of $T_g$ will also be lower.

Materials that show liquid crystal behavior generally have several common characteristics. Among these are a rod-like molecular structure, a rigidity of the long axis, and strong dipoles and/or easily polarizable substituents.

The distinguishing characteristic of the liquid crystalline state is the tendency of the molecules to point along a common axis called the director. This degree of order is responsible for the unique behavior of the material. In contrast, molecules in the liquid phase have no intrinsic order. In the solid state, molecules are highly ordered and have little translational freedom. The characteristic orientational order of the liquid crystal state is found between the traditional solid and liquid phases. The tendency of the liquid crystal molecules to point along the director leads to a condition known as anisotropy. This term means that the properties of a material depend on the direction in which they are measured. For example, when the liquid crystals are oriented in a first direction, the coefficient of friction will have a particular value. When the crystals are oriented in a second direction or randomly, they will have a second value for the coefficient of friction. It is the anisotropic nature of liquid crystals which gives the material the difference in lubricity or different coefficients of friction. The director in this case is an electric field. By placing a current in the circuit 310 the liquid crystals align with the director and produce a surface having a lower coefficient of friction than when the current is not in the circuit 310. When the current is not in the circuit, there is no electric field produced on the surface of the ramp 238.

The liquid crystal state is a distinct phase of matter observed between the crystalline (solid) and isotropic (liquid) states. There are many types of liquid crystal states, depending upon the amount of order in the material. This particular liquid crystal is in the nematic liquid crystal phase. The nematic liquid crystal phase is characterized by molecules that have no positional order but tend to point in the same direction, along the director. Liquid crystals are anisotropic materials, and the physical properties of the system vary with the average alignment with the director. If the alignment is large, the material is very anisotropic. Similarly, if the alignment is small, the material is almost isotropic.

Figure 4:
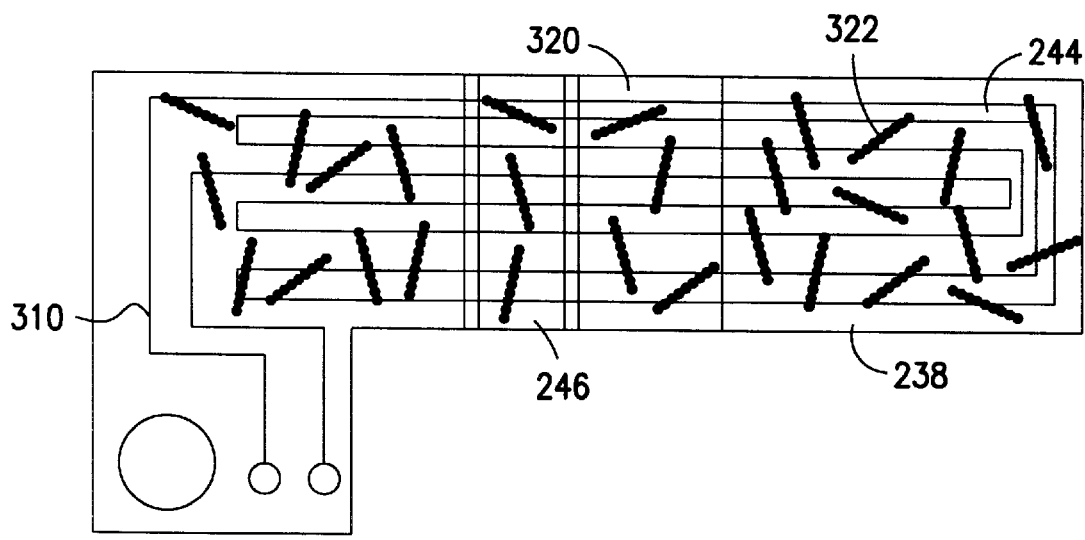
FIG. 4 is a top view of the ramp showing nonaligned liquid crystals.

FIG. 4 is a top view of the ramp 238 showing nonaligned liquid crystals or liquid crystal droplets 322. It should be noted that the liquid crystal droplets 322 are shown in a very enlarged state for the purposes of illustration. In actuality, the liquid crystals 322 are very small. As mentioned above, the liquid crystal droplets 322 are a few microns in length. The electrical circuit 310 is not energized in FIG. 4. In other words, there is no electrical field produced by the electrical circuit on the surface of the ramp 238. As a result, the liquid crystal droplets 322 are not aligned with any director. In other words, the liquid crystal droplets 322 are unaligned and their dipoles go in many random directions. Only one droplet 322 is numbered in FIG. 4. The remaining liquid crystal droplets 322 are unnumbered and their alignment is scattered. Since the liquid crystal droplets 322 are unaligned, the coefficient of friction at the surface of the ramp 238 is higher than when the liquid crystals 322 are aligned. In other words, the lubricity of the ramp is lower than when the electric circuit is carrying a current and producing an electrical field at the surface of the ramp. Having a high coefficient of friction is particularly advantageous when the actuator load spring 124 is parked within the parking detent 246. Since the coefficient of friction is higher than when the liquid crystal droplets 322 are aligned, the load beam 124 is more likely to stay within the park position. Typically when a portable computer is powered down, the electrical circuit 310 carries no current and the actuator stays within the park position due to the higher coefficient of friction produced by the unaligned liquid crystal droplets 322.

Figure 5:
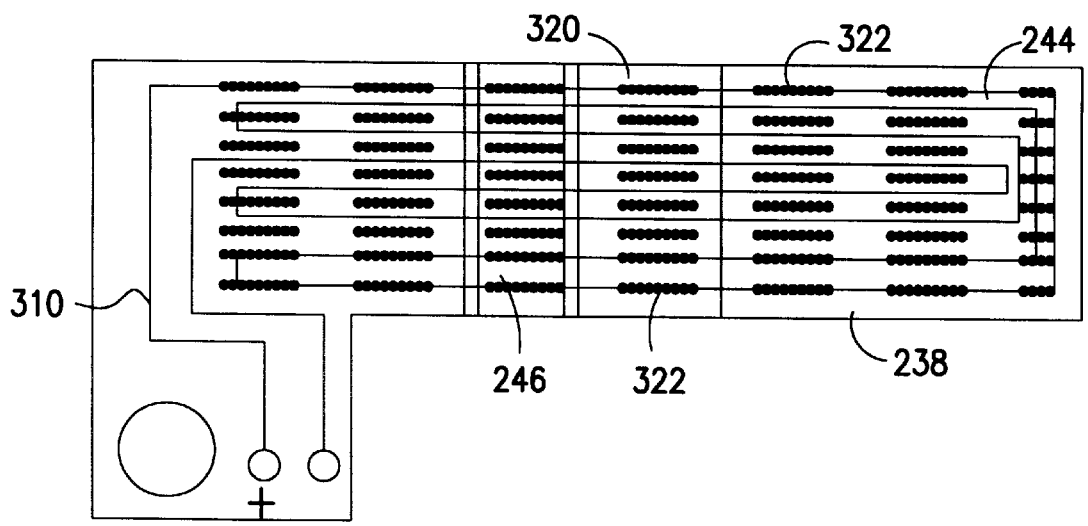
FIG. 5 is a top view of the ramp showing aligned liquid crystals in the presence of an electric field.

FIG. 5 is a top view of a ramp 238 showing aligned liquid crystals 322 in the presence of an electric field. In FIG. 5 the electric circuit 310 is carrying a current and producing an electric field. The electric field acts as a director for the liquid crystal droplets 322. As a result, the liquid crystal droplets 322 align with the electrical field produced by the electrical circuit 310. The end result is a ramp surface which has a multiplicity of aligned liquid crystal droplets 322.

When the liquid crystal droplets 322 are aligned, the coefficient of friction at the surface of the ramp 238 is lower than when the liquid crystals 322 are unaligned. In other words, the surface of the ramp 238 has a higher lubricity when the liquid crystals 322 are aligned. The electrical current can be placed in the electrical circuit 310 when the actuator assembly 120 is to be loaded onto the disk or unloaded from the disk. In other words, the electrical circuit 310 is turned on when the transducer 126 is to be removed from the disk 134 by rotating the actuator assembly 120 so that the actuator arm 124 rides up the inclined surface 244 of the ramp 238 and into the parking detent 246. Once the actuator assembly 120 and its actuator arm 124 are positioned within the parking detent, the energy to the electrical circuit is turned off to keep the actuator assembly parked within the parking detent 246. When the actuator assembly is to load the transducer 126 onto the disk 134, the electrical circuit 310 can be re-energized which causes the liquid crystal droplets 322 to realign and the coefficient of friction on the ramp 238 to lessen. Advantageously, the disk drive 100 can include a controller or use a part of another controller to control when the circuit 310 is energized. By energizing the circuit 310, the liquid crystals 322 are aligned so that the actuator assembly 120 can more easily move the actuator arm 124 up or down the surface of the ramp 238. Once the head or transducing head 126 is parked, the energy to the circuit 310 can be removed to cause a higher coefficient of friction on the surface of the ramp 238. This produces a break or frictional surface which keeps the actuator arm 124 within the parking detent 246.

Figure 6:
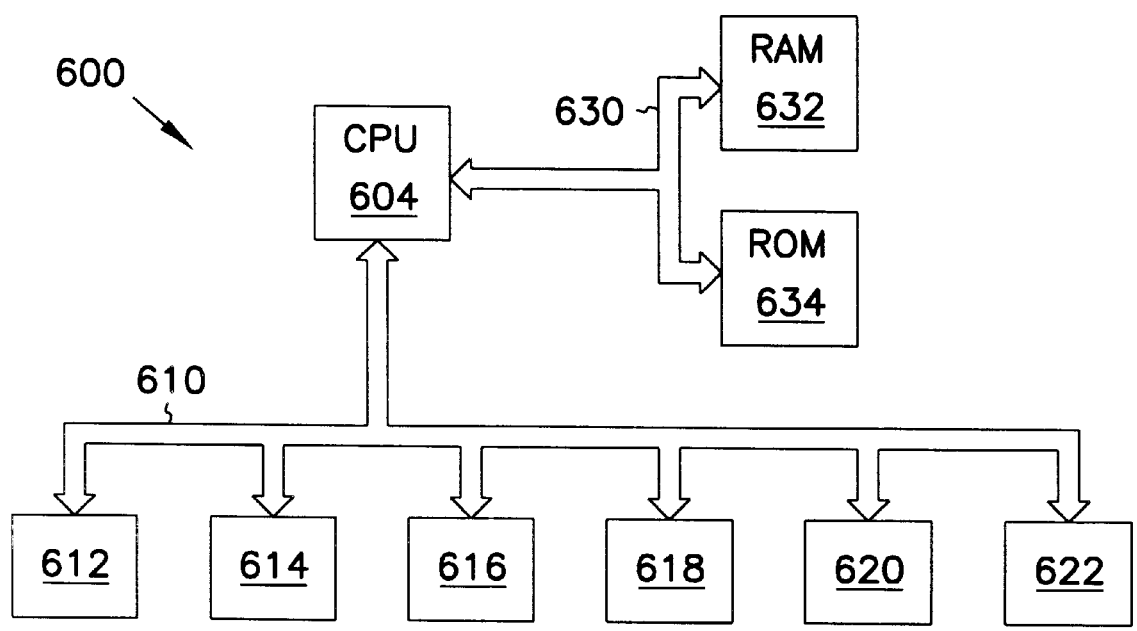
FIG. 6 is a schematic view of a computer system.

FIG. 6 is a schematic view of a computer system. Advantageously, the invention is well-suited for use in a computer system 600. The computer system 600 may also be called an electronic system or an information handling system and includes a central processing unit, a memory and a system bus. The information handling system includes a central processing unit 604, a random access memory 632, and a system bus 630 for communicatively coupling the central processing unit 604 and the random access memory 632. The information handling system 600 includes a disk drive device which includes the ramp described above. The information handling system 600 may also include an input/output bus 610 and several devices peripheral devices, such as 612, 614, 616, 618, 620, and 622 may be attached to the input output bus 610. Peripheral devices may include hard disk drives, magneto-optical drives, floppy disk drives, monitors, keyboards and other such peripherals.

It is to be understood that the above description is intended to be illustrative, and not restrictive. Many other embodiments will be apparent to those of skill in the art upon reviewing the above description. The scope of the invention should, therefore, be determined with reference to the appended claims, along with the full scope of equivalents to which such claims are entitled.

What is claimed is:

1. A magnetic disk drive comprising:
    a base;
    a disk rotatably attached to said base;
    a ramp attached to the base near said disk; and
    a surface of the ramp controllable between a first state where the surface has a first coefficient of friction and a second state where the surface has a second coefficient of friction, the first coefficient of friction different than the second coefficient of friction.

2. The magnetic disk drive of claim 1 wherein the ramp is made of a polymer.

3. A magnetic disk drive comprising: a base; a disk rotatably attached to said base; a ramp attached to the base near said disk; and a lubricant associated with the surface of the ramp, wherein the ramp is made of a polymer and liquid crystals are dispersed within the polymer.

4. A magnetic disk drive comprising: a base; a disk rotatably attached to said base; a ramp attached to the base near said disk; a lubricant associated with the surface of the ramp; and an electrical circuit associated with said ramp, said ramp surface having a first coefficient of friction when an electrical current is passed through the electrical circuit and having a second coefficient of friction without electrical current.

5. The magnetic disk drive of claim 4 further comprising:
    a suspension; and
    a transducer attached to said suspension, said suspension including a portion which contacts the ramp as the transducer is unloaded from the disk, said first coefficient of friction being lower than the second coefficient of friction, said electrical current passed through the electrical circuit as the head is unloaded.

6. The magnetic disk drive of claim 4 further comprising:
    a suspension; and
    a transducer attached to said suspension, said suspension including a portion which contacts the ramp as the transducer is loaded onto the disk, said first coefficient of friction being lower than the second coefficient of friction, said electrical current passed through the electrical circuit as the head is loaded.

7. The magnetic disk drive of claim 4 wherein the ramp includes a detent therein, said disk drive further comprising:
    a suspension; and
    a transducer attached to said suspension, said suspension including a portion which contacts the ramp and rests within said detent after the transducer is unloaded from the disk, said first coefficient of friction being lower than the second coefficient of friction, wherein electrical current is not passed through the electrical circuit when the transducer is parked in the detent.

8. The magnetic disk drive of claim 4 further comprising:
    a controller for controlling electrical current in the electrical circuit, said controller passing electrical current through the electrical circuit as the transducer is loaded onto the disk and unloaded from the disk.

9. A loading and unloading apparatus comprising:
    a ramp; and
    an electrical circuit associated with said ramp so that passing electrical current through the electrical circuit changes the coefficient of friction associated with the surface of the ramp.

10. The loading and unloading apparatus of claim 9 wherein the electrical circuit is embedded within the ramp.

11. The loading and unloading apparatus of claim 9 wherein the electrical circuit is embedded within the ramp, said ramp having liquid crystals dispersed within the surface of the ramp, said liquid crystals changing orientation in the presence of an electric field.

12. The loading and unloading apparatus of claim 9 wherein the ramp is made of a polymer material and includes liquid crystals dispersed within the material of the ramp.

13. An information handling system comprising:
    a base;

a disk rotatably attached to said base; and an actuator assembly movably attached to said base;

a transducer attached to said actuator assembly, said actuator moving between a transducing position and a park position;

a ramp attached to said base, a portion of said actuator assembly passing over the ramp when the actuator is moving to the park position; and an electrical circuit associated with said ramp so that passing electrical current through the electrical circuit changes the coefficient of friction associated with the surface of the ramp.

14. The information handling system of claim 13 wherein the electrical circuit is embedded within the ramp.

15. The information handling system of claim 13 wherein the electrical circuit is embedded within the ramp, said ramp having liquid crystals dispersed within the surface of the ramp, said liquid crystals changing orientation in the presence of an electric field.

16. The information handling system of claim 13 wherein the ramp is made of a polymer material and includes liquid crystals dispersed within the material of the ramp.

17. A ramp for a disk drive comprising:

means for changing an electric field near the surface of the ramp; and means for changing the coefficient of friction on the surface of the ramp in response to the change in the field.

18. The ramp of claim 17 further wherein the means for changing the coefficient of friction includes liquid crystals dispersed in the material of the ramp.

* * * * *